United States Patent [19]

Butsuen et al.

[11] Patent Number: 5,295,705
[45] Date of Patent: Mar. 22, 1994

[54] AUTOMOBILE SUSPENSION INCLUDING CONTROL OF VARIABLE DAMPING COEFFICIENT SHOCK ABSORBER

[75] Inventors: Tetsuro Butsuen; Tohru Yoshioka; Yasunori Yamamoto, all of Hiroshima, Japan

[73] Assignee: Mazda Motor Corporation, Hiroshima, Japan

[21] Appl. No.: 987,176

[22] Filed: Dec. 8, 1992

[30] Foreign Application Priority Data

Dec. 9, 1991 [JP] Japan .................... 3-324190

[51] Int. Cl.$^5$ .................... B60G 17/08; F16F 9/44
[52] U.S. Cl. .................... 280/707; 188/299; 188/319; 364/424.05
[58] Field of Search .................... 280/707, 714; 364/424.05; 188/299, 319

[56] References Cited

U.S. PATENT DOCUMENTS

| | | | |
|---|---|---|---|
| 4,696,489 | 9/1987 | Fujishiro et al. | 280/707 |
| 4,907,154 | 3/1990 | Yasuda et al. | 280/707 X |
| 5,071,159 | 12/1991 | Kamimura et al. | 280/707 |
| 5,096,219 | 3/1992 | Hanson et al. | 280/707 |
| 5,172,929 | 12/1992 | Butsuen et al. | 280/707 |
| 5,193,844 | 3/1993 | Butsuen et al. | 280/707 |

FOREIGN PATENT DOCUMENTS 60-248419 12/1985 Japan .
0163011 7/1986 Japan .

Primary Examiner—Margaret A. Focarino
Assistant Examiner—Peter English
Attorney, Agent, or Firm—Sixbey, Friedman, Leedom & Ferguson

[57] ABSTRACT

Disposed between a sprung element and an unsprung element is a shock absorber of multi-degree variable-damping-coefficient type. The change control of the damping coefficient is carried out so that an actual damping force generated by the shock absorber can harmonize with a target damping force, Fa. The foregoing target damping force, Fa, as functions of the sprung vertical displacement velocity Xs and the unsprung vertical displacement velocity Xu, is obtained by the formula: $Fa = -Xs \cdot gs - Xu \cdot gu$, wherein both gs and gu are coefficients and the relations of $gs > 0$; $gu \geq 0$ hold. Thus, while controlling the sprung vertical motion, cushioning action of the wheels can be enhanced to improve traveling stabilization.

13 Claims, 10 Drawing Sheets

AUTOMOBILE SUSPENSION INCLUDING CONTROL OF VARIABLE DAMPING COEFFICIENT SHOCK ABSORBER

BACKGROUND OF THE INVENTION

This invention generally relates to automobile suspension systems. More particularly, it pertains to an improved automobile suspension system with a shock absorber of multi-degree variable-damping-coefficient type between a sprung element and an unsprung element.

An automobile suspension system generally includes between a body (i.e., the sprung element) and wheels (i.e., the unsprung elements) shock absorbers to damp up-and-down vibration of the wheels. Many types of shock absorbers are known in the art. For example, there is known a shock absorber of bi-degree variable-damping-coefficient type so that the damping coefficient can vary from a greater degree to a lesser degree, and vice versa. A shock absorber of multi-degree or infinitely variable-damping-coefficient type is likewise known.

Conventionally, such a shock absorber employs a control method that its damping coefficient is changed and controlled so as to harmonize an actual damping force, generated by the shock absorber, with a target damping force (i.e., the skyhook damper force) that causes no sprung vertical motion. Japanese Patent Application Laying Open Gazette No. 60-248419 discloses a shock absorber control method which checks for the agreement between a sign of the relative displacement between the sprung element and the unsprung element and another sign of the differentiated value thereof, (i.e., the relative velocity between the sprung element and the unsprung element). At the time when these two signs agree with each other, the damping coefficient of the shock absorber increases, which results in the increase of the damping force generated by the shock absorber. On the other hand, at the time when the two signs disagree with each other, the damping coefficient of the shock absorber decreases, which results in the decrease of the damping force generated by the shock absorber.

Although in the foregoing conventional control method the target damping force is so set that it causes no sprung vertical motion, traveling stabilization decreases because the wheels tend to separate from the road surface at an oscillation frequency in the vicinity of the unsprung resonant point.

SUMMARY OF THE INVENTION

In accordance with the present invention, a target damping force is set taking into account the sprung vertical movement as well as the unsprung oscillation, in performing the variable control of the damping coefficient of the shock absorbers, in order to improve traction and cushioning action of the wheels against the road surface. Thus, better traveling stabilization can be accomplished.

The suspension system of the invention includes a shock absorber of multi-degree variable-damping-coefficient type, a damping force detection means, and a control means. The shock absorber is disposed between a sprung element and an unsprung element. The damping force detection means detects an actual damping force generated by the shock absorber. The control means is supplied with a signal from the damping force detection means to change and control the damping coefficient of the shock absorber thereby harmonizing the foregoing actual damping force with a target damping force. The target damping force, Fa, as functions of the sprung vertical displacement velocity Xs and the unsprung vertical displacement velocity Xu, is obtained by the following formula.

$$Fa = -Xs \cdot gs - Xu \cdot gu,$$

wherein both gs and gu are coefficients and the relations of $gs > 0$; $gu \geq 0$ hold.

With the above-described constitution, the target damping force is calculated by taking into account the term ($Xs \cdot gs$) of the sprung vertical movement as well as the term ($Xu \cdot gu$), and the control means performs the function of the change control of the damping coefficient of the shock absorber to have an actual damping force generated by the shock absorber harmonize with the target damping force. This accomplishes the control of the sprung vertical movement and the improvements of cushioning action, thus leading to the improvements of traveling stabilization.

BRIEF DESCRIPTION OF THE DRAWINGS

Other objects, features, and advantages of the present invention will become apparent from the following description of an embodiment by reference to the accompanying drawings in which.

DESCRIPTION OF THE PREFERRED EMBODIMENT

Figure 1:
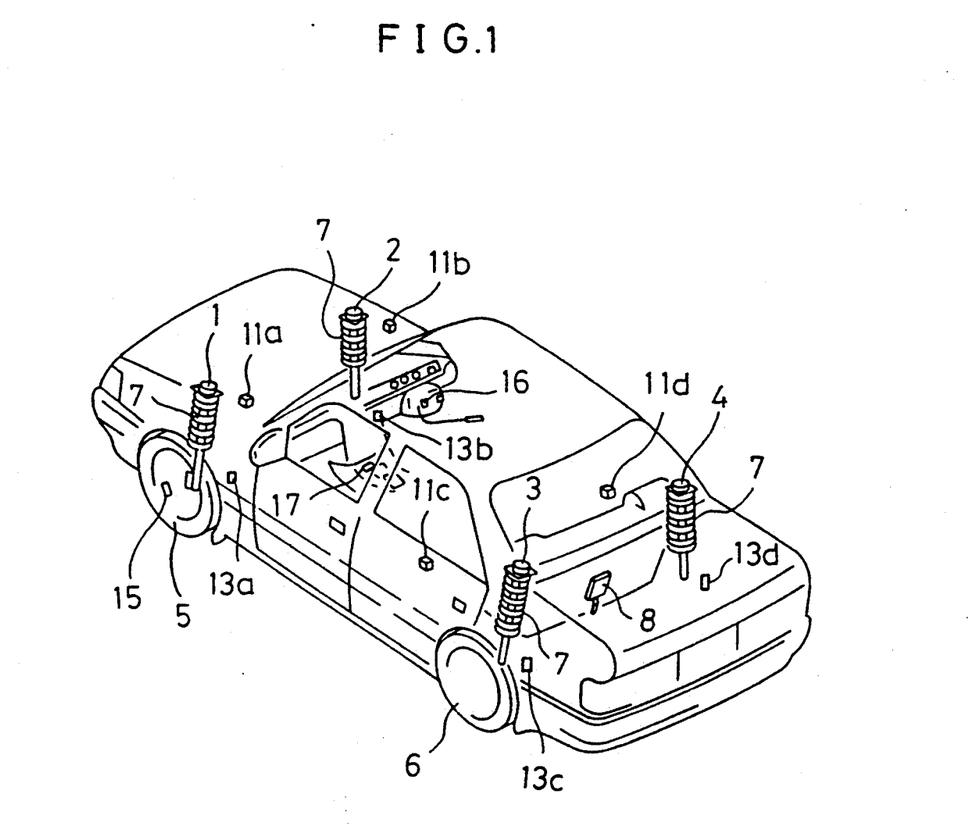
FIG. 1 is a perspective view illustrating a suspension system along with the layout of its components of the present invention.

The present invention is now described below by reference to the accompanying drawings. Shown in FIG. 1 is the layout of components of a suspension system of an embodiment of the invention. The suspension system, shown in FIG. 1, includes four shock absorbers 1, 2, 3, and 4 for four wheels (only LF (left front) and LR (left rear) wheels 5 and 6, however, are shown here), to damp spring oscillation due to up-and-down motion of the wheels. Each one of the shock absorbers 1, 2, 3, and 4 incorporates an actuator (see FIGS. 2 and 3) so that the damping coefficient is available at ten different degrees, and a pressure sensor (not shown) used to detect the magnitude of the actual damping force. Coil springs, indicated by the reference numeral 7, are arranged around the upper outer surfaces of the shock absorbers 1, 2, 3, and 4. A control unit is indicated by the reference numeral 8, which receives detection signals from the pressure sensors and sends out control signals to the actuators to change and control the damping coefficients of the actuators.

Four sprung acceleration sensors are indicated by the reference numerals 11a, 11b, 11c, and 11d, respectively, each detecting the sprung vertical acceleration per wheel. Four unsprung acceleration sensors are indicated by the reference numerals 13a, 13b, 13c, and 13d, respectively, each detecting the unsprung vertical acceleration per wheel. A speed sensor 15 is provided which detects traveling speed, based on the rotational speed of the LF wheel 5 of a driven wheel. A steering angle sensor 16 detects the steering angle of the LF wheel 5, based on the revolution of a steering shaft. A driver-operated mode selector 17 is used to select a desired mode from among HIGH MODE, SOFT MODE, and CONTROL MODE with respect to the damping coefficients of the shock absorbers 1, 2, 3, and 4. More specifically, if the driver selects HIGH MODE, this means that a greater degree damping coefficient is selected to generate a harder damping force. If SOFT MODE is selected, on the other hand, this means that a lesser degree damping coefficient is selected to generate a softer damping force. CONTROL MODE allows the control unit 8 to change and control the damping coefficients of the shock absorbers 1, 2, 3, and 4 either by means of a map or by means of a table stored in advance in the control unit 8. This change control is detailed later.

Figure 2:
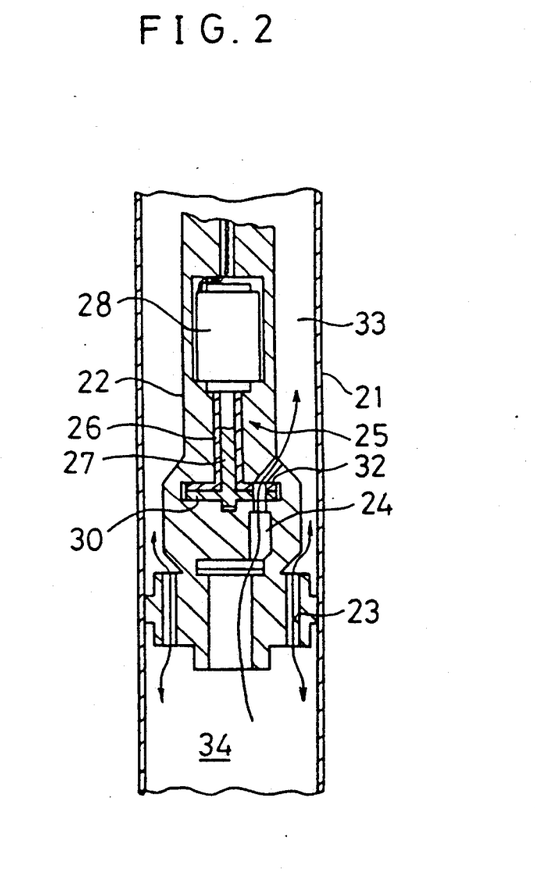
FIG. 2 shows in vertical section the main section of a shock absorber of the suspension system of the invention.

With reference to FIG. 2, the organization of the shock absorbers 1, 2, 3, and 4 is now illustrated. Note that the pressure sensors, incorporated into each shock absorber, are not shown here for the sake of simplicity. A cylinder is indicated by the reference numeral 21. A piston and a piston rod are machined integrally to form a piston unit 22. The piston unit 22 is so fitted into the cylinder 21 that it can slide through the cylinder 21. The cylinder 21 is connected to the sprung element by way of one connection structure and the piston unit 22, on the other hand, is connected to the sprung element by way of the other.

Figure 3:
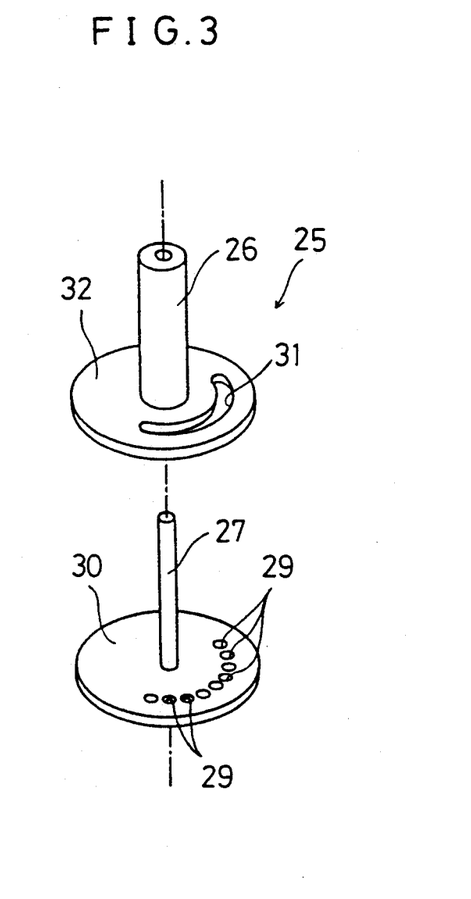
FIG. 3 is an exploded perspective view showing an actuator of the shock absorber of the suspension system of the invention.

The piston unit 22 has two portions defining two orifices 23 and 24. Of these orifices, the orifice 23 is so designed that it is open at all times, while on the other hand the orifice 24 is so designed that it can throttle flow at ten different degrees of opening by means of the actuator 25. The actuator 25, as shown in FIG. 3, includes a sleeve 26, arranged in the piston unit 22 in a stationary manner; a shaft 27 that extends through the sleeve 26 in a rotatable manner; a step motor 28 (not shown in FIG. 3 but in FIG. 2) that rotates the shaft 27 a predetermined angle at a time; a first orifice plate 30 that is connected to the lower end of the shaft 27 to rotate together with the shaft 27 and has portions defining nine circular openings 29 in a circumferential direction at predetermined intervals; and a second orifice plate 32 that is attached to the lower end of the sleeve 26 and has a portion defining a crescent-like opening 31 in a circumferential direction. The operation of the step motor 28, which results in the revolution of the first orifice plate 30, causes the relative positions of the circular openings 29 to the crescent-like opening 31 to change. In other words, at one position, the openings 29 and the opening 31 face each other, and at the other they do not. Further, the number of the openings 29 facing the opening 31 sequentially changes from zero to nine.

Upper and lower chambers 33 and 34 within the cylinder 21, the circular openings 29 and the crescent-like opening 31 within the cylinder 21 that communicate with both of chambers 33 and 34 are all filled with fluid having an appropriate viscosity. Such fluid travels between the upper chamber 33 and the lower chamber 34 either through the orifice 23 or through the orifice 24.

Figure 4:
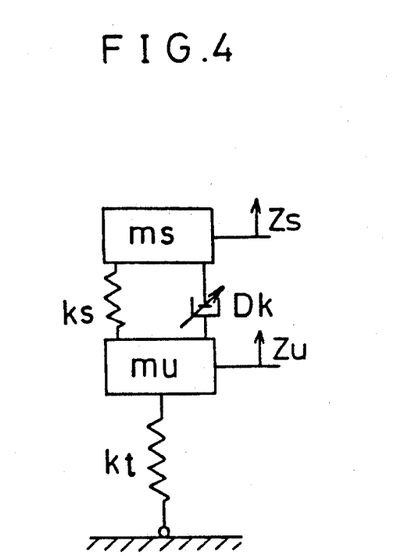
FIG. 4 is an oscillation model diagram of the suspension system of the invention.

FIG. 4 illustrates an oscillation model of the suspension system of the invention where ms is the sprung mass, mu is the unsprung mass, zs is the sprung displacement, zu is the unsprung displacement, ks is the spring rate of the coil spring 7, kt is the spring rate of the tire, and Dk is the damping coefficient of the shock absorbers 1, 2, 3, and 4.

Figure 5:
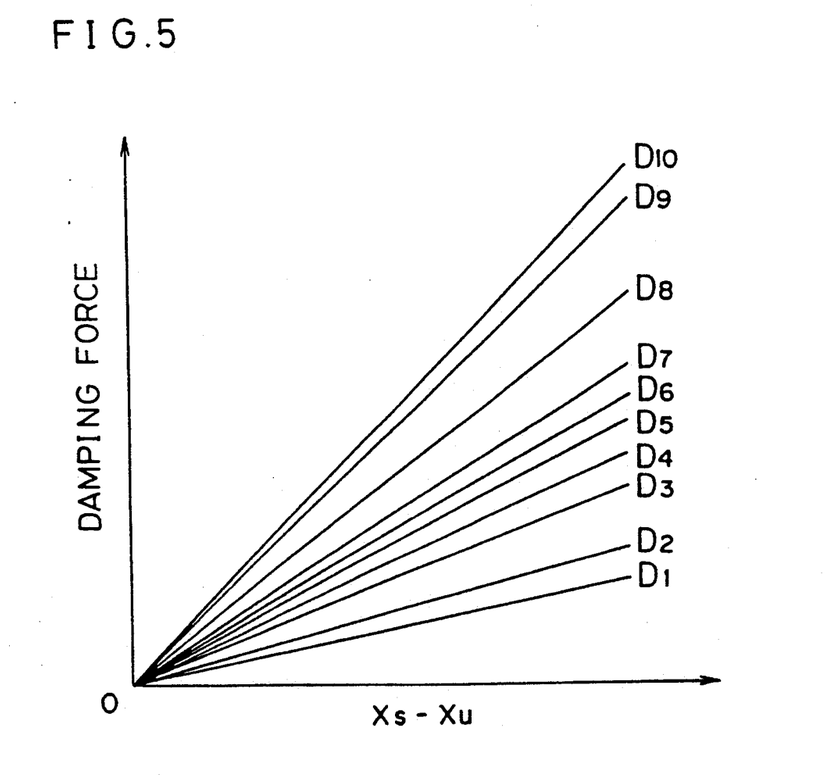
FIG. 5 shows the damping coefficient of the shock absorber of the invention.

FIG. 5 is a graph showing the damping coefficients D1 through D10 of the shock absorbers 1, 2, 3, and 4. The ordinate indicates the damping force generated by the shock absorbers 1, 2, 3, and 4, while the abscissa indicates the difference between the sprung displacement velocity, Xs (dzs/dt) and the unsprung displacement velocity, Xu (dzu/dt) (i.e., the relative displacement velocity between the sprung element and the unsprung element (Xs−Xu)). The damping coefficients D1 through D10 of ten degrees are available for the shock absorbers 1, 2, 3, and 4. Of these damping coefficients, the damping coefficient D1 is a damping coefficient that generates a softest damping force, whereas the damping coefficient D10 is a damping coefficient that generates a hardest damping force. Here, the damping coefficient Dk, where the letter "k" changes from one to ten and represents the degree of the damping coefficient, is selected according to the number of the circular openings 29 communicating with the crescent-like opening 31 (i.e., (10−k)). The damping coefficient D1, therefore, is selected when all of the nine circular openings 29 of the first orifice plate 30 communicate with the crescent-like opening 31 of the second orifice plate 32. The damping coefficient D10 meanwhile is selected when none of the openings 29 communicate with the crescent-like opening 31.

Figure 6:
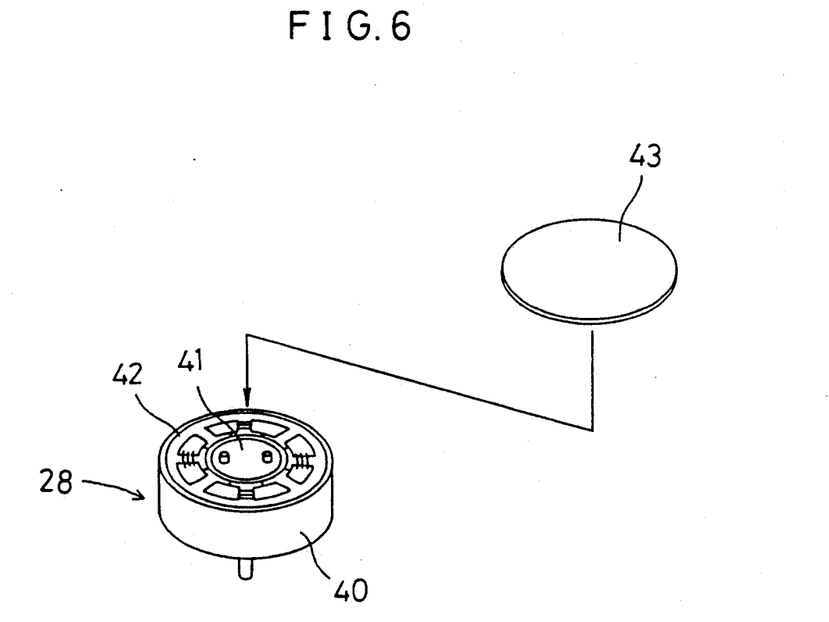
FIG. 6 is a perspective view of a step motor built in the foregoing shock absorber.
Figure 7:
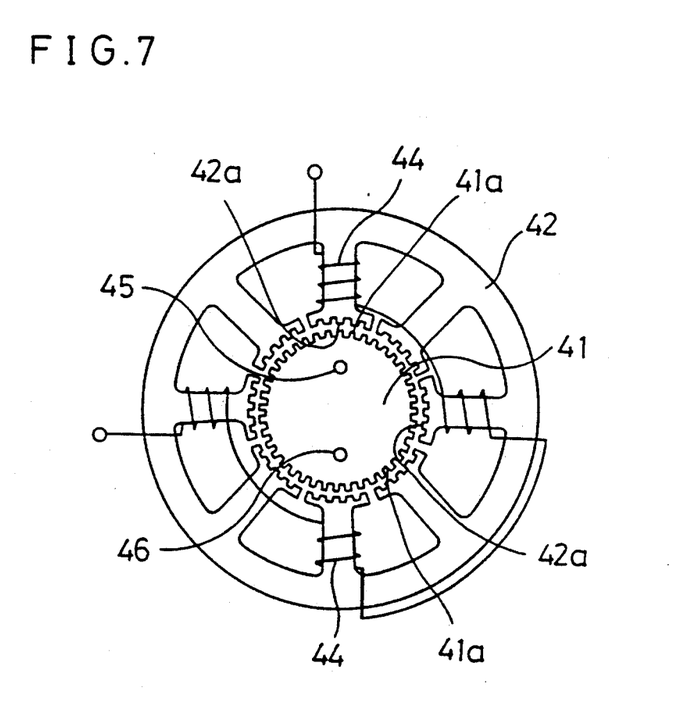
FIG. 7 is a plan view showing a rotor and a stator of the step motor of FIG. 6.
Figure 8:
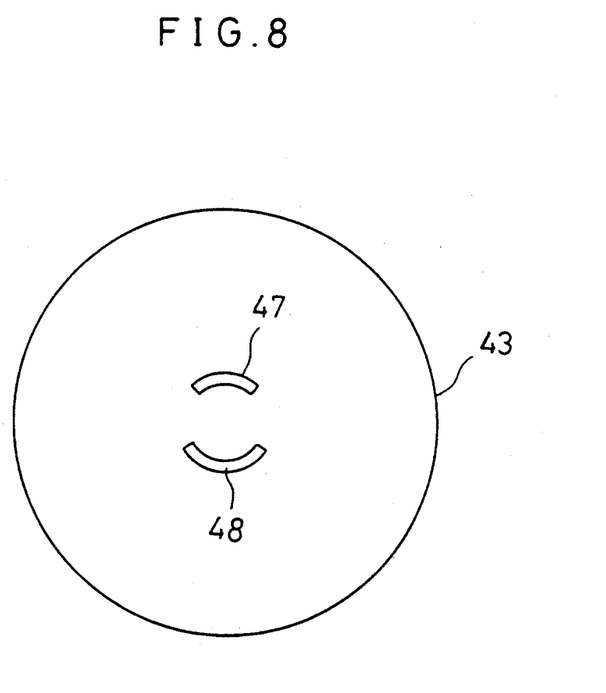
FIG. 8 is a bottom plan view of a cover of the step motor of FIG. 6.

FIGS. 6 and 7 both illustrate the organization of the step motor 28 comprised of a bottomed, tubular casing 40, a rotor 41 and a stator 42 both housed within the casing 40, and a cover 43 for the casing 40. Provided at the outer periphery of the rotor 41 are a plurality of rectangular teeth 41a. Correspondingly, a plurality of rectangular teeth 42a are provided at the inner periphery of the stator 42. A solenoid 44 is wound around the stator 42. Two projecting stopper pins 45 and 46 are disposed on one surface of the rotor 41 opposite the cover 43 so that the pins 45 and 46 face each other across the axis of rotation of the rotor 41. Formed on the underside of the cover 43 are two circular arc-like interlocking grooves 47 and 48 that locate at corresponding positions to the stopper pins 45 and 46, as shown in FIG. 8. The groove 47 engages with the stopper pin 45 to limit the range of rotation of the step motor 28, and the groove 48 engages with the stopper pin 46. The engagement of the stopper pins 45 and 46 with the grooves 47 and 48 ensures that the axis of rotation of the rotor 41 will not deviate. The groove 48 has a greater round angle than the groove 47 in relation to the center of the cover 43, so that the range of rotation of the step motor 28 is mainly limited by the groove 47. If the rotor 41 of FIG. 7 rotates clockwise, this causes the damping coefficient Dk of the shock absorbers 1, 2, 3, and 4 to increase whereby the resulting damping force becomes harder. On the other hand, if the rotor 41 rotates counterclockwise, this causes the damping coefficient Dk to decrease whereby the resulting damping force becomes softer. Further, if the tooth 41a of the rotor 41 travels to a position facing the tooth 42a of the stator 42, that is, the step motor 28 rotors one step, this allows the damping coefficient Dk to change by one degree. Therefore, if the stopper pin 45 stays at the leftmost end (the first reference position) of the groove 47 in FIG. 8, the damping coefficient Dk is now at the damping coefficient D10 that allows the shock absorbers 1, 2, 3, and 4 to generate a hardest damping force. Conversely, if the stopper pin 45 stays at the right-most end (the second reference position) of the groove 47 in FIG. 8, the damping coefficient Dk is now at the dampening coefficient D1 that allows the shock absorbers 1, 2, 3, and 4 to generate a softest dampening force.

Figure 9:
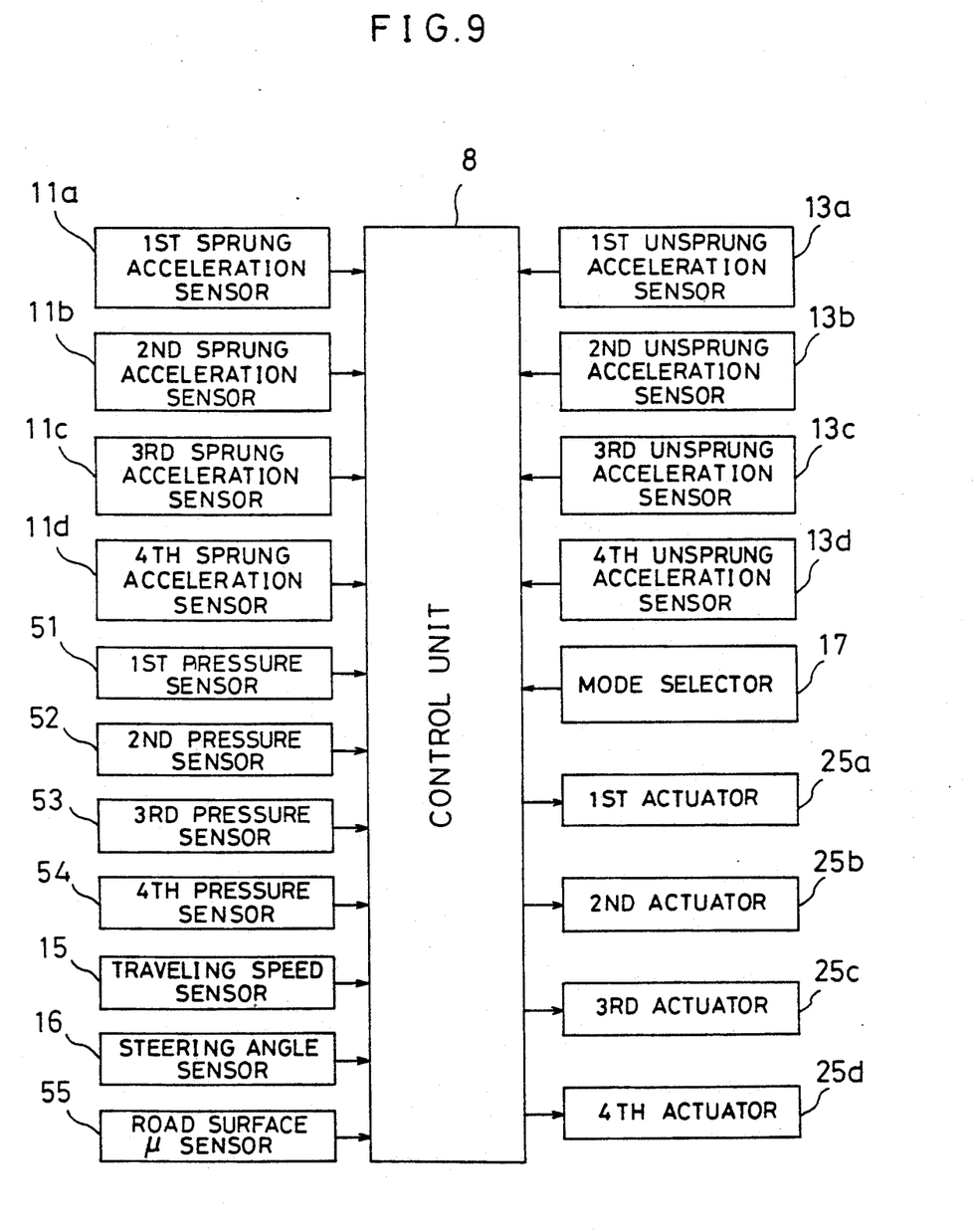
FIG. 9 is a block diagram showing the organization of a control unit of the suspension system of the invention.

Reference is now made FIG. 9 for the description of the organization of a control system of the suspension system of the invention. For the LF wheel 5, a first pressure sensor 51, a first sprung acceleration sensor 11a, a first unsprung acceleration sensor 13a, and a first actuator 25a are provided. For the RF wheel (not shown), a second pressure sensor 52, a second sprung acceleration sensor 11b, a second unsprung acceleration sensor 13b, and a second actuator 25b are provided. For the LR wheel 6, a third pressure sensor 53, a third sprung acceleration sensor 11c, a third unsprung acceleration sensor 13c, and a third actuator 25c are provided. For the RR wheel (not shown), a forth pressure sensor 54, a forth sprung acceleration sensor 11d, a forth unsprung acceleration sensor 13d, and a fourth actuator 25d are provided. The actuators 25a, 25b, 25c, and 25d and the actuator 25 of FIG. 2 are of the same type. The pressure sensors 51, 52, 53, and 54, built in the respective shock absorbers 1, 2, 3, and 4, serves as a damping detection means so that they perform the function of detecting actual damping forces generated by the shock absobers 1, 2, 3, and 4.

The reference numerals 15, 16, and 17 represent the speed sensor, the steering angle sensor, and the mode selector, respectively. Additionally, a road surface $\mu$ sensor, indicated by the reference numeral 55, is provided which is used to detect the coefficient of friction, $\mu$ of a road surface. The road surface $\mu$ sensor 55 detects the coefficient of friction by a conventional method, for example, by such a method in which the coefficient of friction is detected by the traveling speed and the differential values of the traveling speed (i.e., the vehicle body acceleration). Detection signals of the foregoing sensors, switches and like elements are all fed to the control unit 8. The control unit 8 sends out control signals to the first to fourth actuators 25a through 25d. The actuators 25a through 25d operate by such control signals to change and control the damping coefficient Dki where the letter "k" represents the degree of damping coefficient and takes values ranging from one to ten, and the letter "i" identifies the actuators 25a through 25d or the shock absorbers 1 through 4 and takes values ranging from one to four. The speed sensor 15, the steering angle sensor 16, and the road surface $\mu$ sensor 55 perform the function of detecting traveling conditions of the automobile.

Figure 10:
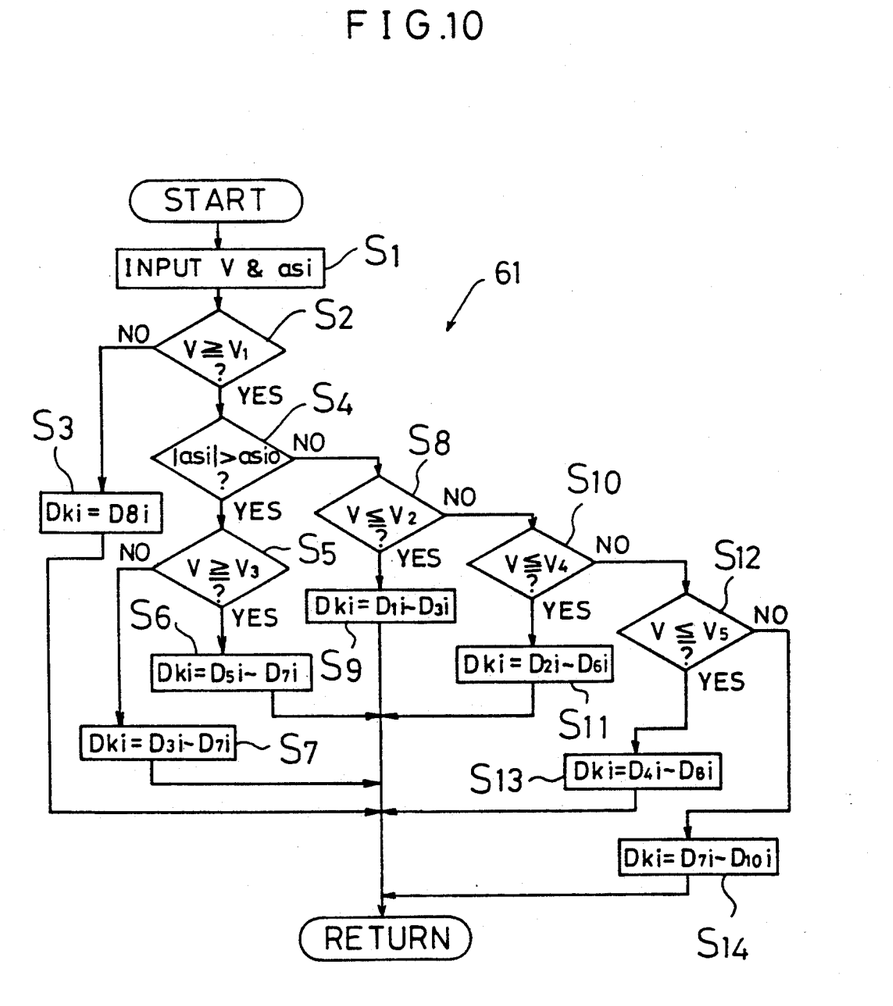
FIG. 10 is a flowchart showing damping coefficient limitation routines.

The following describes how the control unit 8 changes and controls the damping coefficient Dki of the stock absorbers 1, 2, 3, and 4. This change control operation is carried out according to the flowcharts of FIGS. 10 and 11. The flowchart of FIG. 10 shows damping coefficient limitation routines in which the range of selection of the damping coefficient Dki of ten degrees is changed on a limited basis. In other words, out of the ten degrees certain degrees are selected as the range of selection thereby forcing the damping coefficient Dki of the shock absorbers 1, 2, 3, and 4 to change between the selected degrees. The flowchart of FIG. 11, on the other hand, shows basic routines of the change control of the damping coefficient Dki executed at the time when the mode selector 16 is in the position of CONTROL MODE.

SIGNAL of the traveling speed V detected by means of the speed sensor 15, along with SIGNAL of the sprung vertical accelerations asi detected by the sprung acceleration sensors 11a through 11d, is first supplied to the control unit 8 (STEP S1 of FIG. 10).

STEP S2 checks whether the traveling speed V is greater than the first predetermined traveling speed V1 such a very low speed as 3 km/h. If $V<V1$ (i.e., the diagnosis is NO), the procedure then advances to step S3. Since the traveling speed V indicates a very low speed, the damping coefficient DKi of each shock absorber is fixed at the degree of D8i for harder damping forces to prevent unwanted motion such as damping dive from taking place. Here, since the damping coefficient Dki is fixed at D8i, no basic routines for the change control of the damping coefficient Dki of FIG. 1 are carried out.

If $V>V1$ (i.e., YES), this causes the procedure to advance to STEP S4. STEP S4 checks whether the absolute value of the sprung vertical acceleration asi is greater than the predetermined value asi0 (that is, checks whether the automobile is now traveling over a rough road the condition of which is indicated by a value greater than the asi0). If the diagnosis is YES, this causes the procedure to advance to STEP S5 that checks whether the traveling speed V is greater than the third predetermined traveling speed V3 (for example, 50 km/h).

If the diagnosis at STEP S5 is YES, the damping coefficient Dki will be set within the range of from D5i to D7i so that the change control of the damping coefficient Dki can be executed within such a range for relatively hard damping forces, in view of the improvements of traveling stabilization. As a result of this, in the basic routines of FIG. 11, the damping coefficient D5i becomes a lower limit value. The damping coefficient Dki keeps remaining at the degree of D5i even though certain conditions, requiring the damping coefficient Dki now is selection to change to a lesser degree for a softer damping force, are established. The damping coefficient D7i, on the other hand, becomes an upper limit value. The damping coefficient Dki keeps remaining at the degree of D7i even though certain conditions, requiring the Dki now in selection to change to a greater degree for a harder damping force, are established.

If the diagnosis at STEP S5 is NO, this causes the procedure to advance to STEP S7. Since making the improvements of traveling stabilization compatible with the improvements of riding comfort are required, the damping coefficient Dki is set within the range of from D3i to D7i so that it is possible for the damping coefficient Dki to be changed and controlled within the range of from one condition for a relatively soft damping force to the other for a hard damping force. As a result of this, in the basic routines of FIG. 11, the damping coefficient D3i becomes a lower limit value. The damping coefficient Dki keeps remaining at the degree of D3i even though certain conditions, requiring the damping coefficient Dki now in selection to change to a lesser degree for a softer damping force, are established. The damping coefficient D7i, on the other hand, becomes an upper limit value. The damping coefficient Dki keeps remaining at the degree of D7i even though certain conditions, requiring the damping coefficient Dki now in selection to change to a greater degree for a harder dampening force, are established.

If the diagnosis at STEP S4 is NO, which means that the automobile is now traveling not over a rough road but over an average condition road, STEP S8 checks whether the traveling speed V is lower than the second predetermined traveling speed V2 (for instance, 30 km/h). If YES is obtained here, the damping coefficient Dki is set within the range of from D1i to D3i so that the change control of the damping coefficient Dki can be executed within such a range for relatively soft damping forces, in view of the improvements of riding comfort. As a result of this, in the basic routines of FIG. 11, the damping coefficient Dki keeps remaining at the degree of D1i even though certain conditions, requiring the damping coefficient Dki now in selection to change to a lesser degree for a softer damping force, are established. The damping coefficient D3i becomes an upper limit value. The damping coefficient Dki keeps remaining at the degree of D3i even though certain conditions, requiring the damping coefficient Dki now in selection to change to a greater degree for a harder dampening force, are established.

If STEP S8 results in NO, STEP S10 further checks whether the traveling speed V is lower than the forth predetermined traveling speed V4 (for example, 60 km/h). If STEP S10 results in YES, this causes the procedure to advance to STEP S11. Since making the improvements of traveling stabilization compatible with the improvements of riding comfort is required, the damping coefficient Dki is set within the range of from D2i to D6i so that it is possible for the damping coefficient Dki to be changed and controlled within the range of from one condition for a relatively soft damping force to the other for a hard damping force. As a result of this, in the basic routines of FIG. 11, the damping coefficient D2i becomes a lower limit value. The damping coefficient Dki keeps remaining at the degree of D2i even though certain conditions, requiring the damping coefficient Dki now in selection to change to a lesser degree for a softer damping force, are established. The damping coefficient D6i, on the other hand, becomes an upper limit value. The damping coefficient Dki keeps remaining at the degree of D6i even though certain conditions, requiring the damping coefficient Dki now in selection to change to a greater degree for a harder damping force, are established.

If, however, STEP S10 gives a diagnosis of NO, this causes the procedure to advance to STEP S12 that checks out whether the traveling speed V is lower than the fifth predetermined traveling speed V5 (for example, 80 km/h). If STEP S12 results in YES, the procedure then advances to STEP S13 where the damping coefficient Dki is set within the range of from D4i to D8i to change and control the damping coefficient Dki suitable for a slightly harder damping force while at the same time improving traveling stabilization together with riding comfort. As a result of this, in the basic routines of FIG. 11, the damping coefficient D4i becomes a lower limit value. The damping coefficient Dki keeps remaining at the degree of D4i even though certain conditions, requiring the damping coefficient Dki now in selection to change to a lesser degree for a softer damping force, are established. The damping coefficient D8i, on the other hand, becomes an upper limit value. The damping coefficient Dki keeps remaining at the degree of D8i even though certain conditions, requiring the damping coefficient Dki to change to a greater degree for a harder damping force, are established.

If the diagnostic at STEP S12 is NO which indicates a high traveling speed, the procedure advances to STEP S14 at which the damping coefficient Dki will be set within the range of from D7i to D10i so as to change and control the damping coefficient Dki within such a range for achieving hard damping forces, in view of the improvements of traveling stabilization. As a result of this, in the basic routines of FIG. 11, the damping coefficient D7i becomes a lower limit value. The damping coefficient Dki keeps remaining at the degree of D7i even though certain conditions, requiring the damping coefficient Dki now in selection to change to a lesser degree for a softer damping force, are established. The damping coefficient Dki keeps remaining at the degree of D10i even though certain conditions, requiring the damping coefficient Dki now in selection to change to a greater degree for a harder damping force, are established.

Figure 11:
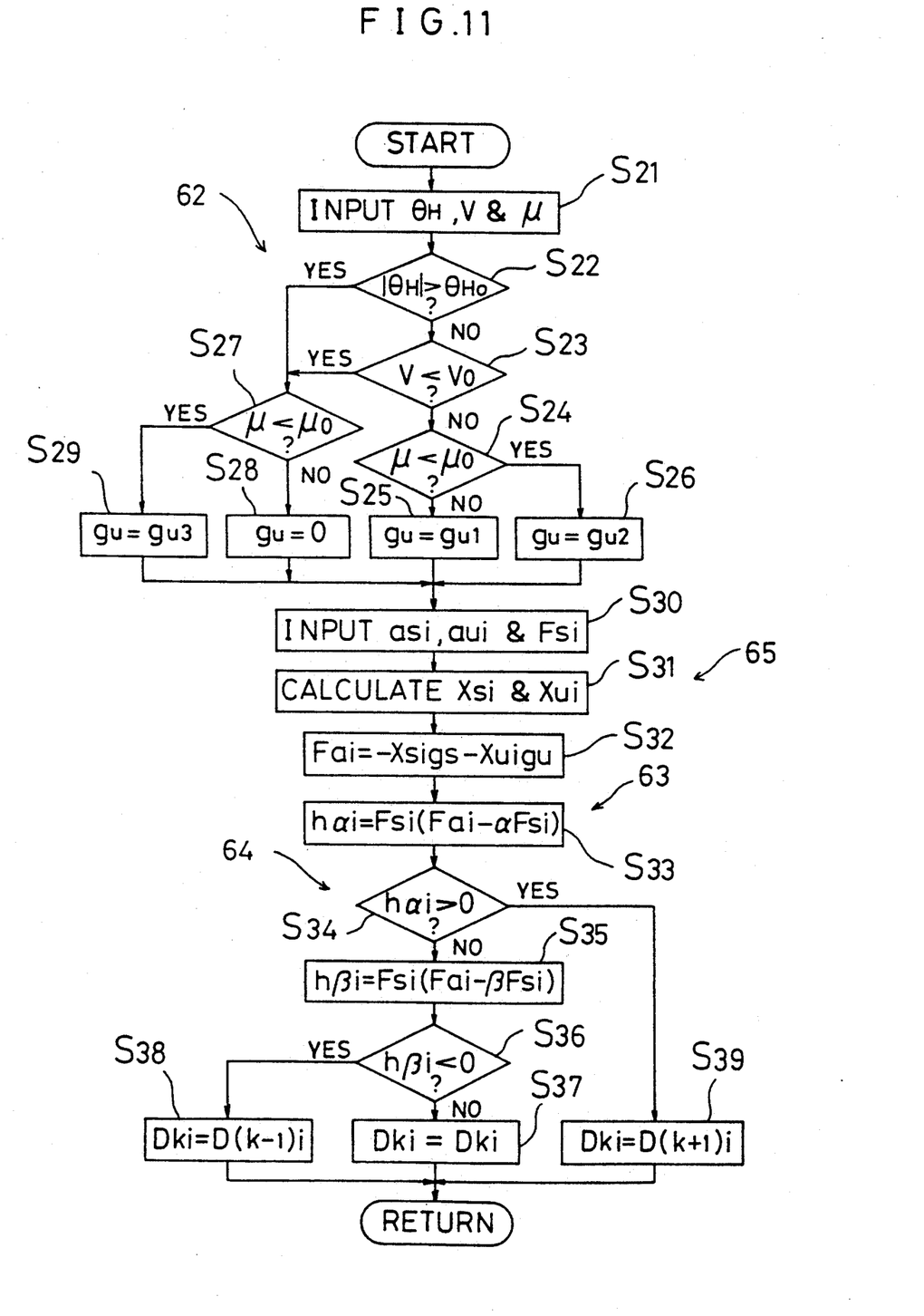
FIG. 11 is a flowchart showing basic routines of the change control of the damping coefficient.

With regard to the above-described basic routines of FIG. 11, a limitation means 61 is provided. The limitation means 61 determines the upper limit damping coefficient Dki as well as the lower limit damping coefficient Dki of each shock absorber according to such traveling conditions as a traveling speed, and further limits the range of selection of the damping coefficient Dki.

In the basic routines of FIG. 11 for the damping coefficient change control, at STEP S21, the steering angle $\theta H$, the traveling speed V, and the road surface friction coefficient $\mu$, detected by the steering angle sensor 16, the speed sensor 15, and the road surface $\mu$ sensor 55, respectively, are input. Then, STEP S22 checks whether the automobile is turning at the steering angle $\theta$ whose absolute value exceeds the predetermined steering angle $\theta HO$, and STEP S23 checks whether the automobile is traveling at a low speed, that is, checks whether the traveling speed V is lower than the traveling speed VO.

If both STEP S22 and STEP S23 result in NO's, STEP S24 checks whether the road surface friction coefficient $\mu$ is lower than the predetermined value $\mu 0$, that is, checks whether the automobile is now traveling on a road surface whose coefficient of friction is low. If the diagnosis at STEP S24 is NO, which indicates a non-low $\mu$ road surface, the coefficient gu is set to gu1 at STEP S25, and if YES, which indicates a low μ road surface, the coefficient gu is set to gu2 at STEP S26. If either STEP S22 or STEP S23 results in YES, STEP S27 checks whether the road surface friction coefficient μ is lower than the predetermined value μ0. If the diagnosis at STEP S27 is NO, the coefficient gu is set to zero at STEP S28. If the diagnosis at STEP S27 is YES, which indicates a low μ road surface, the coefficient gu is set to gu3 at STEP S26. Here, gu1, gu2, and gu3 are all positive values, and the relationships between the three coefficients are: gu1<gu2<gu3.

With the coefficient gu set, at STEP S30, respective SIGNALS of the sprung vertical accelerations asi, detected by the sprung acceleration sensors 11a, 11b, 11c, and 11b, the unsprung vertical accelerations aui, detected by the unsprung vertical acceleration sensors 13a, 13b, 13c, and 13d, and the actual damping forces Fsi of the shock absorbers 1, 2, 3, and 4, detected by the pressure sensors 51, 52, 53, and 54, are input. Then, at STEP S31, the sprung vertical acceleration asi is integrated to obtain the sprung vertical displacement velocity Xsi (=Σasi), and the unsprung vertical acceleration aui is integrated to obtain the unsprung vertical displacement velocity Xui (=Σaui). At STEP S32, as functions of both the sprung displacement velocity Xsi and the unsprung displacement velocity Xui, the target damping force Fai is calculated by the following Formula (1).

$$Fai = -Xsi \cdot gs - Xui \cdot gu \quad (1)$$

wherein gs is a positive coefficient, like gu.

hαi is calculated by the following Formula (2), at STEP S33.

$$h\alpha i = Fsi \cdot (Fai - \alpha \cdot Fsi) \quad (2)$$

Thereafter, STEP S34 checks whether hαi is positive or not. If hαi is found to be positive, that is, YES is obtained, this supplied the actuators 25a, 25b, 25c, and 25d with control signals at STEP S39, whereby the step motors 28 rotate one step clockwise to achieve the damping coefficient D(K+1) i greater than the previous damping coefficient Dki by one degree, for harder damping forces. If hαi is found not to be positive, that is, the diagnosis is NO, this causes the procedure to advance to STEP S35. hβi is calculated by the following Formula (3).

$$h\beta i = Fsi \cdot (Fai - \beta \cdot Fsi) \quad (2)$$

Thereafter, STEP S36 checks whether hβi is negative or not. If hβi is found to be negative, that is, YES is obtained, this supplies the actuators 25a, 25b, 25c, and 25d with control signals at STEP S38, whereby the step motors 28 of the actuators rotate one step counterclockwise to achieve the damping coefficient D(K−1) i lower than the previous damping coefficient Dki by one degree, for softer damping forces. If, meanwhile, hβi is found not to be negative, that is, in the case of NO, this makes no changes to the damping coefficient Dki, in other words, none of the step motors 28 rotate at STEP S37, and the procedure advances to the next cycle with the previous damping coefficient Dki unchanged.

The thresholds α and β serve to prevent the damping coefficient Dki from being changed many times, and are set by: α>1; 0<β<1.

If Fsi and Fai are the same sign, (Fai−α·Fsi) of Formula (2) is likely to become a different sign from Fsi compared to such a case where Fsi is not multiplied by α, since α>1. As a result of this, hαi is likely to be negative, which hampers the damping coefficient Dki to change to a greater degree for a harder damping force. (Fai−β·Fsi) of Formula (3) is likely to become the same sign as Fsi compared to such a case where Fsi is not multiplied by β, since 0<β<1. As a result of this, hβi is likely to be positive, which hampers the damping coefficient Dki to change to a lesser degree for a softer damping force.

Conversely, if Fsi and Fai are different signs, it is unachievable to harmonize the damping force Fsi with the ideal damping force, or the skyhook damper force Fai. In view of this, it is preferably to bring the damping coefficient Dki to around zero, in other words, to change the damping coefficient Dki to a lesser degree suitable for a softer damping force. For the present embodiment, if Fsi and Fai are different signs, both hαi and hβi become negative values. This results in the control unit 8 achieving the damping coefficient D(k−1)i that is lower than the previous damping coefficient Dki by one degree. Therefore, the foregoing requirements are satisfied.

A target damping force calculation means 62 is provided which performs the function of calculating the target damping force Fai in changing and controlling the damping coefficient Dki of the shock absorbers 1, 2, 3, and 4 (STEP S21 to STEP S32). A vertical displacement velocity calculation means 65 is provided which performs the function of calculating the sprung displacement velocity Xs by integrating the sprung vertical acceleration asi and the unsprung displacement velocity Xu by integrating the unsprung vertical acceleration aui (STEP S31). A control means 63 is provided which performs the function of changing and controlling the damping coefficient Dki of the shock absorbers thereby harmonizing the damping force Fsi with the target damping force Fai (STEP S33 to STEP S39). An inhibition means 64 is provided which performs the function of inhibiting the control means 63 from performing the function of changing and controlling the damping coefficient Dki if the difference between the Fsi and the Fai falls in the range of a predetermined value (that is, is within the dead band zone) (STEP S33 to STEP S37).

In accordance with the above-described change control of the damping coefficient, the target damping force Fai is calculated by Formula (1) wherein the term (Xsi·gs) of the sprung vertical motion and the term (Xui·gu) of the unsprung vertical motion are taken into account, and the change control of the damping coefficient is done to have the actual damping force Fsi generated by the shock absorber harmonize with the target damping force Fai. Thus, the sprung vertical motion can be controlled while at the same time improving the cushioning action of the wheels even in the vicinity of the resonant point, and traveling stabilization can be also improved.

Additionally, the foregoing coefficient gu of the sprung vertical motion term is a variable that varies depending on the traveling condition of the automobile. Since the coefficient gu becomes zero at the time when the automobile is turning at above the predetermined steering angle θH0, there is only the sprung vertical motion term left for the target damping force Fai. Thus, the control is done focusing mainly on controlling the sprung vertical motion. This prevents rolling motion from occurring and ensures traveling stabilization.

Even at the time when the automobile is traveling at a low speed, which causes no unsprung resonant, the coefficient gu of the unsprung vertical motion term becomes zero. There is only the sprung vertical motion term left for the target damping force Fai. The sprung vertical motion can positively be prevented.

The coefficient gu is greater when the friction coefficient $\mu$ is lower than the predetermined value $\mu 0$, compared to when the friction coefficient $\mu$ is greater than the predetermined value $\mu 0$. Thus, the control is done focusing mainly on controlling the unsprung vertical motion, and cushioning action of the wheels can be improved according to the slide degree of the wheels. Traveling stabilization can be improved.

Figure 12:
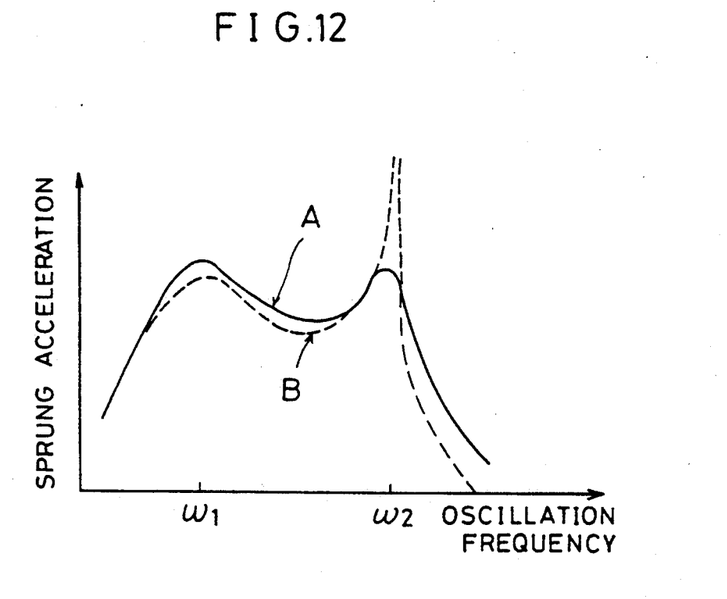
FIG. 12 is a characteristic diagram showing the varying relationship of the sprung acceleration versus the oscillation frequency.
Figure 13:
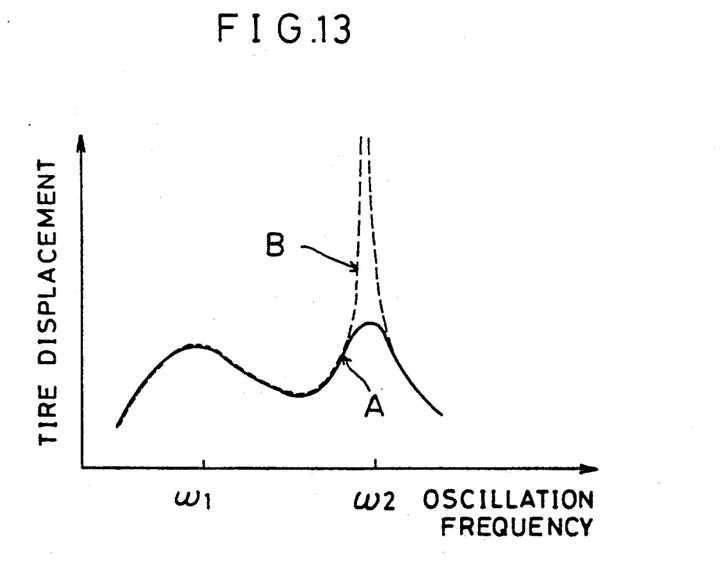
FIG. 13 is a characteristic diagram showing the varying relationship of the tire displacement versus the oscillation frequency.

Now reference is made to FIGS. 12 and 13 in which the embodiment of the present invention is indicated by line A and the prior art by line B. As seen from these figures, although, in the present invention, the sprung acceleration slightly increases in the vicinity of the sprung resonant point $\omega 1$, compared to the prior art, both the tire vertical displacement and the sprung acceleration are decreased to a greater extent as the resonant is controlled at the unsprung resonant point $\omega 2$.

The invention claimed is:

1. A suspension system for automobiles, said suspension system comprising:
    a shock absorber of multi-degree variable-damping-coefficient type which is disposed between a sprung element and an unsprung element;
    means for determining a sprung vertical displacement velocity of said sprung element;
    means for determining an unsprung vertical displacement velocity of said unsprung element;
    damping force detection means which detects an actual damping force generated by said shock absorber; and
    control means which is supplied with a signal from said damping force detection means and then changes and controls a damping coefficient of said shock absorber to set the damping force generated by said shock absorber equal to a target damping force;
    whereby the target damping force, Fa is obtained by the following formula, as a function of the sprung vertical displacement velocity, Xs and the unsprung vertical displacement velocity, Xu:

$$Fa = -Xs \cdot gs - Xu \cdot gu,$$

wherein both gs and gu are coefficients and gs>0 and gu≧0.

2. The suspension system of claim 1, further including traveling condition detection means for detecting a traveling condition, wherein the coefficient gu is a variable that varies depending on the traveling condition detected by said traveling condition detecting means.

3. The suspension system of claim 2, wherein said traveling condition detection means detects a steering angle as the traveling condition wherein the coefficient gu is set so that the coefficient gu becomes zero at the time when the automobile is making a turning movement.

4. The suspension system of claim 2, wherein said traveling condition detection means detect a traveling speed as the traveling condition wherein the coefficient gu is set so that the coefficient gu becomes zero at the time when the automobile is traveling at a low speed.

5. The suspension system of claim 2, wherein said traveling condition detection means detects a friction coefficient of a road surface over which the automobile is traveling as the traveling condition wherein the coefficient gu is set so that the coefficient gu increases as the friction coefficient decreases.

6. The suspension system of claim 2, wherein said shock absorber includes:
    a cylinder;
    a piston unit having a portion defining an orifice, the piston unit being fit and inserted into said cylinder; and
    an actuator that can gradually throttle said orifice at plural degrees.

7. The suspension system of claim 6, wherein said actuator includes:
    a shaft, rotatably mounted within said piston unit;
    a step motor that rotates said shaft a predetermined angle at a time;
    a first orifice plate, mounted at the lower end of said shaft to rotate together with said shaft and provided with portions defining a plurality of circular openings that are formed at predetermined intervals in the circumferential direction of said first orifice plate; and
    a second orifice plate provided with a portion defining a crescent-shaped opening which is aligned with said orifice and aligned with said plurality of circular openings of said first orifice plate;
    whereby said step motor operates to rotate said first orifice plate, which results in changing the number of said plurality of circular openings aligned with said crescent-shaped opening to gradually throttle said orifice at plural degrees.

8. The suspension system of claim 7, wherein said step motor includes:
    a tubular casing with a bottom;
    a rotor housed within said casing;
    a stator housed within said casing; and
    a cover for said casing;
    whereby:
    one face of said rotor opposite said cover is provided with two projecting stopper pins that face each other across the axis of rotation of said rotor;
    said cover is provided with two circular arc-like interlocking grooves that interlock with said stopper pins respectively so as to support said rotor without causing deviation of the axis of rotation of said rotor as well as to limit the range of rotation of said rotor.

9. The suspension system of claim 1, further including:
    sprung acceleration detection means for detecting a sprung vertical acceleration;
    unsprung acceleration detection means for detecting an unsprung vertical acceleration; and
    vertical displacement velocity calculation means for calculating a sprung vertical displacement velocity, Xs by integrating the sprung vertical acceleration as well as an unsprung vertical displacement velocity, Xu by integrating the unsprung vertical acceleration;
    whereby said control means uses the displacement velocity, Xs and the displacement velocity, Xu to calculate the target damping force, Fa.

10. The suspension system of claim 1, further including:
    travelling condition detection means which detects a traveling condition; and limitation means that selects some damping coefficients from among damping coefficients available for said shock absorber for limiting the range of selection, based on the travelling condition detected by said traveling condition means wherein the number of the selected damping coefficients is lower than that of the available damping coefficients;

whereby said control means is designed to select a single damping coefficient from among the damping coefficients selected by said limitation means.

11. The suspension system of claim 10, wherein said traveling condition detection means detects a traveling speed as the traveling condition, and said limitation means selects greater damping coefficients as the range of selection as the traveling speed increases.

12. The suspension system of claim 10, wherein said traveling condition detection means detects a sprung vertical acceleration as the traveling condition, and said limitation means selects greater damping coefficients when the sprung vertical acceleration is greater than a predetermined value, compared to when the sprung vertical acceleration is lower than the predetermined value, as the range of selection.

13. The suspension system of claim 1, further including inhibition means for inhibiting said control means from performing a change control function if the difference between the actual damping force generated by said shock absorber and the target damping force falls in the range of a predetermined value.

* * * * *